United States Patent
Brück

(10) Patent No.: US 6,365,283 B1
(45) Date of Patent: Apr. 2, 2002

(54) MONOLITHIC METALLIC HONEYCOMB BODY WITH A VARYING NUMBER OF CHANNELS AND METHOD FOR MANUFACTURING THE HONEYCOMB BODY

(75) Inventor: Rolf Brück, Bergisch Gladbach (DE)

(73) Assignee: Emitec Gesellschaft fur Emissionionstechnologie mbH, Lohmar (DE)

(*) Notice: Subject to any disclaimer, the term of this patent is extended or adjusted under 35 U.S.C. 154(b) by 0 days.

(21) Appl. No.: 09/722,082

(22) Filed: Nov. 27, 2000

Related U.S. Application Data

(63) Continuation of application No. PCT/EP99/03388, filed on May 17, 1999.

(30) Foreign Application Priority Data

May 26, 1998 (DE) .......................... 198 23 469

(51) Int. Cl.⁷ .......................... B01J 35/04; F01N 3/28; B32B 3/28
(52) U.S. Cl. .......................... 428/593; 428/603; 502/439; 502/527.22; 422/180; 29/890
(58) Field of Search .......................... 428/593, 603; 502/439, 527.22; 422/180; 29/890

(56) References Cited

U.S. PATENT DOCUMENTS

| | | | |
|---|---|---|---|
| 3,785,781 A | * | 1/1974 | Hervert et al. .............. 423/212 |
| 4,273,681 A | * | 6/1981 | Nonnenmann .............. 252/472 |
| 4,847,966 A | * | 7/1989 | Kuchelmeister .......... 29/157 R |
| 5,153,167 A | * | 10/1992 | Saito et al. .................. 502/439 |
| 5,162,288 A | * | 11/1992 | Stringaro .................... 502/439 |
| 5,328,774 A | * | 7/1994 | Maus et al. ................. 428/593 |
| 5,549,873 A | | 8/1996 | Pott ........................... 422/180 |
| 5,591,413 A | * | 1/1997 | Toyoda ....................... 422/180 |
| 5,658,536 A | * | 8/1997 | Okabe et al. ............... 422/180 |
| 6,057,263 A | * | 5/2000 | Takahashi et al. .......... 502/439 |

FOREIGN PATENT DOCUMENTS

| | | |
|---|---|---|
| EP | 0 245 737 A1 | 11/1987 |
| EP | 0 245 737 B1 | 11/1987 |
| EP | 0 430 945 B1 | 6/1991 |
| EP | 0 484 364 B1 | 5/1992 |
| EP | 0 542 775 B1 | 5/1993 |

OTHER PUBLICATIONS

International Publication WO 90/03220 (Maus et al.), dated Apr. 5, 1990.
International Publication WO 92/02716 (Maus et al.), dated Feb. 20, 1992.
International Publication WO 97/23325 (Sheller), dated Jul. 3, 1997.

* cited by examiner

*Primary Examiner*—John J. Zimmerman
(74) *Attorney, Agent, or Firm*—Herbert L. Lerner; Laurence A. Greenberg; Werner H. Stemer

(57) ABSTRACT

A monolithic honeycomb body includes mutually spaced-apart inlet and outlet flow ends, different successive sections between the flow ends, and at least partially structured sheet metal layers having structures forming walls defining channels through which a fluid can flow in one flow direction. The channels have sizes or numbers varying in the different successive sections in the flow direction. At least a part of the structured sheet metal layers extend from the inlet flow end to the outlet flow end. Each of the sheet metal layers has at least a first structure and a second structure with different dimensions. At least one of the structures extends over only one of the sections. A method for manufacturing the honeycomb body is also provided.

22 Claims, 2 Drawing Sheets

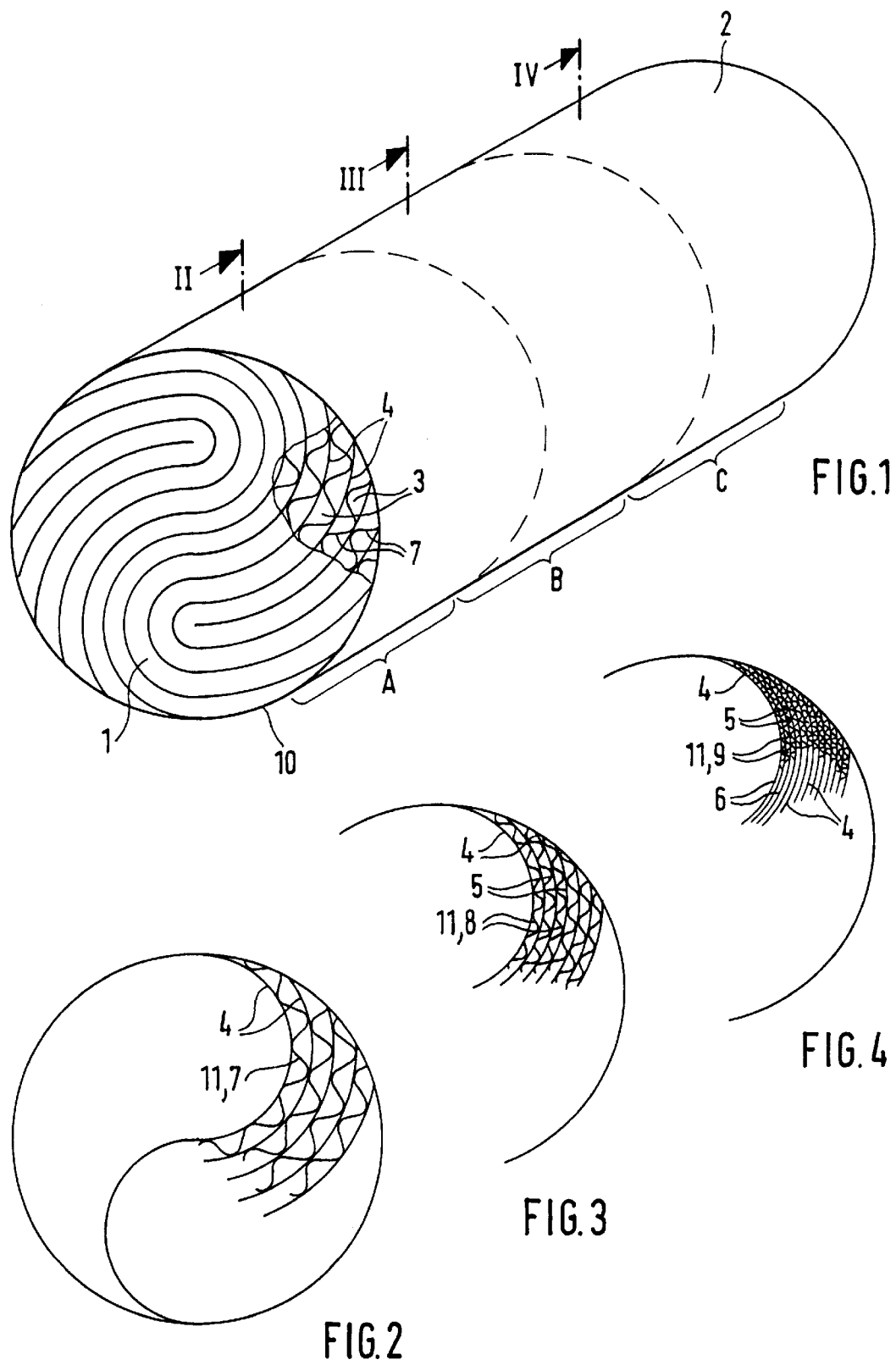

MONOLITHIC METALLIC HONEYCOMB BODY WITH A VARYING NUMBER OF CHANNELS AND METHOD FOR MANUFACTURING THE HONEYCOMB BODY

CROSS-REFERENCE TO RELATED APPLICATION

This application is a continuation of copending International Application No. PCT/EP99/03388, filed May 17, 1999, which designated the United States.

BACKGROUND OF THE INVENTION

Field of the Invention

The present invention relates to a monolithic metallic honeycomb body with a varying number of channels, which is preferably used as a catalyst carrier body for the catalytic conversion of exhaust emissions from internal combustion engines. The invention also relates to a method for manufacturing the honeycomb body.

Such honeycomb bodies are known in a large number of configurations as is disclosed, for example, by European Patent 0 245 737 B1, corresponding to U.S. Pat. Nos. 4,832,998; 4,803,189; 4,946,822; and 4,923,109 and European Patent 0 430 945 B1, corresponding to U.S. Pat. Nos. 5,139,844; 5,105,539; and 5,135,794.

It is also known that for the most efficient exhaust emission control it may be advisable to place a plurality of sheet metal layers, possibly having a differing honeycomb structure or honeycomb size, in series in the direction of flow. However, such a body is no longer monolithic. As a result, higher costs are incurred in the manufacture, incorporation into a casing pipe and possibly also in the coating of the honeycomb body. The creation of additional internal flow edges for metal honeycomb bodies by turning over partial areas of corrugation crests or corrugation troughs is therefore also disclosed, for example, by European Patent 0 484 364 B1. Although, with respect to the internal flow distribution of the honeycomb body, that achieves an effect similar to that of sheet metal layers having differing channel sizes disposed in series, the catalytically active surface which is available remains the same. Therefore, all of the advantages of sheet metal layers with differing channel sizes disposed in series cannot actually be obtained thereby.

U.S. Pat. No. 5,549,873 also discloses a monolithic honeycomb body, in which a leading area has a smaller number of channels and a lower heat capacity than remaining area due to cut-outs in the sheet metal layers.

In order to refer to a honeycomb body as a monolithic body it must have an internal cohesion. European Patent 0 542 775 B1, corresponding to U.S. Pat. No. 5,328,774, has already disclosed a monolithic honeycomb body, in which the internal cohesion is achieved through the use of sheet metal layers, which are smooth or slightly structured relative to the dimensions of the channels. That is accomplished in such a way that a part of the sheet metal layers in the honeycomb body extends continuously from the inlet flow end to the outlet flow end. The honeycomb body has different numbers of sheet metal layers and channels per cross-sectional area. In other words, channels of differing size, in different succeeding sections, are provided in the direction of flow. In a honeycomb body disclosed by European Patent 0 543 775 B1, the desired variation in the number of channels and therefore in the catalytically active surface areas is achieved in such a way that the monolithic honeycomb body is constructed from sheet metal layers having different widths and differently dimensioned structures. The present invention proceeds from that state of the art.

The manufacture of such a honeycomb body is relatively expensive, since a plurality of differently structured sheet metal layers have to be layered on top of and along side one another. Handling such a layered stack is comparatively difficult, especially when the stack with both of its ends is to be coiled around a minimum of two fixed points.

SUMMARY OF THE INVENTION

It is accordingly an object of the invention to provide a monolithic metallic honeycomb body with a varying number of channels and a method for manufacturing the honeycomb body, which overcome the hereinafore-mentioned disadvantages of the heretofore-known devices and methods of this general type and in which the honeycomb body is easier to manufacture with a varying number of channels and possibly a heat capacity varying from section to section as well.

With the objects of the invention in view there is provided, in accordance with the invention, a monolithic honeycomb body, comprising mutually spaced-apart inlet and outlet flow ends; different successive sections between the flow ends; at least partially structured sheet metal layers having structures forming walls defining channels through which a fluid can flow in one flow direction; the channels having sizes or numbers varying in the different successive sections in the flow direction; at least a part of the structured sheet metal layers extending from the inlet flow end to the outlet flow end, for achieving an internal cohesion of the body; each of the sheet metal layers having at least a first structure and a second structure with different dimensions; and at least one of the structures extending over only one of the sections.

In contrast to the known monolithic honeycomb body, the internal cohesion is not (solely) achieved by sheet metal layers which are smooth or slightly structured relative to the dimension of the channels, but (also) by the structured sheet metal layers having structures which form channels in the flow direction. This reinforces the cohesion of the body and/or simplifies the manufacture, because there are fewer individual structured sheet metal strips to be handled.

In accordance with another feature of the invention, there are provided sheet metal layers which are smooth or slightly structured relative to the dimensions of the channels and are disposed between the structured sheet metal layers. The sheet metal layers that are smooth or slightly structured relative to the dimensions of the channels extend over at least one section of the honeycomb body. Smooth sheet metal layers, which extend over the entire length of the honeycomb body, may also be provided. These sheet metal layers which are smooth or slightly structured relative to the dimensions of the channels lend the honeycomb body additional internal support, thereby further reinforcing the monolithic characteristic of the honeycomb body.

In accordance with a further feature of the invention, there are provided further structured sheet metal layers, which extend over at least one section of the honeycomb body. Such a honeycomb body is consequently constructed from sheet metal layers with differing widths and structures having differing dimensions, thereby achieving a variation in the number of channels and therefore also in the catalytically active surface areas. The additional structured sheet metal layers are preferably disposed between the sheet metal layers extending from the inlet flow end to the outlet flow end. They occupy the intervals between the latter sheet metal layers.

In accordance with an added feature of the invention, the additional structured sheet metal layers are disposed in such a way that the honeycomb body has a constant cross-section in the direction of flow. Such a honeycomb body requires a casing having a simple construction, which in the case of a honeycomb body with a circular cross section may be a tubular construction.

In accordance with an additional feature of the invention, each structured sheet metal layer extending right through the entire body has structures which are constructed symmetrically relative to a common plane. A honeycomb body constructed from sheet metal layers which have such a structure is easier to handle, since there is no need to consider its orientation.

In accordance with yet another feature of the invention, the structured sheet metal layers passing right through the entire body have physical dividing lines, formed at an interval from one another and running between adjacent structures having different dimensions substantially transversely to the direction of flow. The advantage of such sheet metal layers resides in the fact that between the adjacent structures having different dimensions there is an abrupt transition between the structures. The straight-line length of the structures having different dimensions is equal to the length of the physical dividing line. The structures may have different heights or shapes.

In accordance with yet a further feature of the invention, the connection between the adjacent structures having different dimensions is maintained through the sections between the physical dividing lines. The section between two adjacent dividing lines lies at least partially on a common side of the adjacent structure. The structures may have an undulating or meandering form, for example. In the case of a meandering structure, the section may extend over the entire common side of the adjacent structures. If the structures are constructed with an undulating form having differing amplitudes, the adjacent structures preferably have sides with an equal gradient. The sections between two physical dividing lines then lie on the common sides.

In accordance with yet an added feature of the invention, instead of common sides, the adjacent structures may also have common crests and/or troughs.

Configurations of a honeycomb body are known, which can be constructed from a plurality of individual sheet metal layers. Configurations are also known in which the entire honeycomb body includes just one or two spirally wound or meandering sheet metal layers. The term intertwined is used herein as a generic term and it is of no importance whether the individual sheet metal layers are wound or folded. The invention may also be used for configurations in which the structured sheet metal layers are not separated by smooth sheet metal layers, but instead have adjacent structured sheet metal layers with structures running at an angle to one another.

For many applications it is advisable for a honeycomb body to have a greater heat capacity internally than in its inlet end area. Where the honeycomb body is used as catalyst carrier in the exhaust system of an internal combustion engine this feature enhances the characteristics when restarting the engine after interrupted running. In the case of diesel engines and lean-burn engines, for example, it permits continuous catalytic conversion even under heavily fluctuating operating conditions with phases in which relatively cold exhaust emissions reach the catalytic converter. In the case of the present invention, the heat capacity is influenced by the thickness of the sheet metal layers, so that the additional sheet metal layers can be made at least partially thicker in selected areas in order to increase the heat capacity in these selected areas.

With the objects of the invention in view, there is additionally provided a method for manufacturing a monolithic honeycomb body, which comprises forming structures in at least one sheet metal layer; intertwining the at least one sheet metal layer to form a honeycomb body with walls formed by the structures defining channels through which a fluid can flow in one flow direction; and before or during the forming of the structures, forming mutually spaced apart physical dividing lines in each of the sheet metal layers along a common imaginary line running substantially transversely to the flow direction, and forming the structures with different dimensions, especially different structural heights, on both sides of the dividing lines. The differing structures may be formed successively or simultaneously.

In accordance with another mode of the invention, the dividing line is incorporated into the sheet metal layer by cutting. The cutting process as such may be performed through the use of a cutter, preferably a rotary cutter. According to a further proposal the physical dividing line is formed into the sheet metal layer through the use of a laser cutting process.

In accordance with a concomitant mode of the invention, the dividing line and the structures are formed simultaneously, by running a sheet metal strip through two different corrugated rollers situated side by side on a common axis.

Other features which are considered as characteristic for the invention are set forth in the appended claims.

Although the invention is illustrated and described herein as embodied in a monolithic metallic honeycomb body with a varying number of channels and a method for manufacturing the honeycomb body, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic, perspective view of a honeycomb body;

FIGS. 2, 3 and 4 are fragmentary, cross-sectional views taken along respective lines II—II, III—III and IV—IV of FIG. 1, in the direction of the arrows;

DESCRIPTION OF THE PREFERRED EMBODIMENTS

Figure 5:
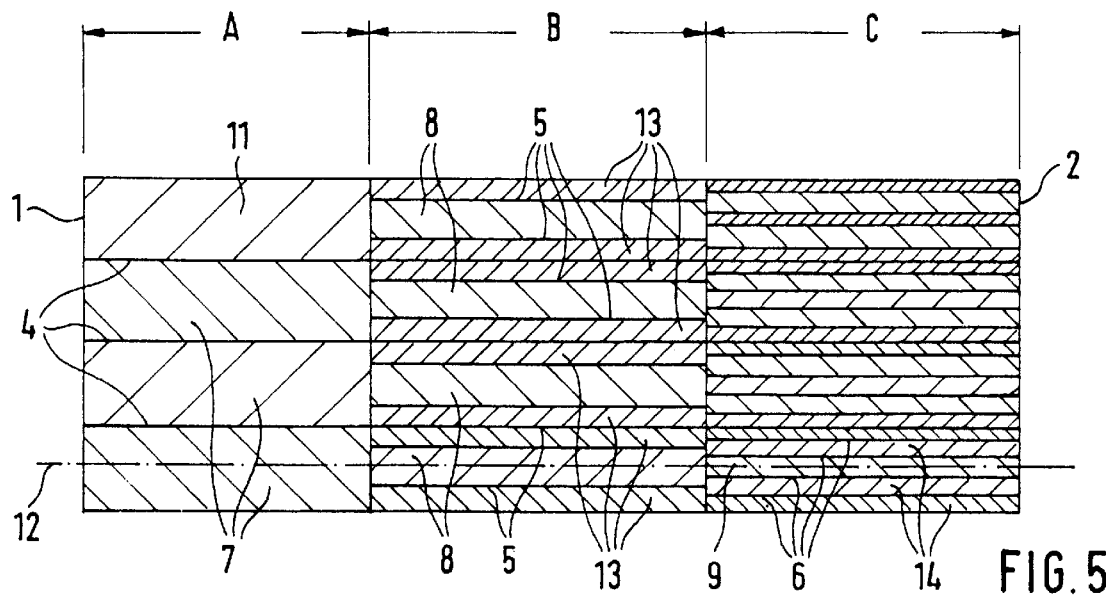
FIG. 5 is a longitudinal, sectional view through the honeycomb body according to FIG. 1.

Referring now to the figures of the drawings in detail and first, particularly, to FIG. 1 thereof, there is seen a perspective view of an embodiment of a honeycomb body according to the invention with an inlet flow end 1 and an outlet flow end 2. The honeycomb body derives its internal cohesion from structured sheet metal layers 11 seen in FIGS. 2, 3 and 4, which extend completely through the entire honeycomb body. The structured sheet metal layers 11 each run in an S shape, as can also be seen from FIGS. 2, 3 and 4. The structured sheet metal layers 11 each have differing structures indicated by reference numerals 7, 8 and 9 in sections A, B, C, according to FIGS. 1–4. Smooth sheet metal layers 4 are disposed between the structured sheet metal layers 11. The structures 7, 8 and 9 together with the smooth sheet metal layers 4 each form flow channels 3, the cross sectional area of which differs in the sections A, B and C.

FIG. 5 shows a longitudinal section of a honeycomb body. The smooth sheet metal layers 4 are represented as continuous lines. The hatched lines in FIG. 5 are intended to represent structures of corrugated sheet metal layers.

The number of channels per cross-sectional area differs in each of the three sections A, B and C of the honeycomb body. In section A the height of the structure 7 of the structured sheet metal layers 11 extending from the inlet flow end 1 to the outlet flow end 2 is greatest opposite the succeeding sections B, C. The structured sheet metal layers 11 are separated from one another by the smooth sheet metal layers 4. In the embodiment shown in FIG. 5 the additional smooth sheet metal layers 4 extend from the inlet flow end 1 to the outlet flow end 2. This is due to the fact that the sum of the structure heights in sections B, C between the sheet metal layers 11 is equal to the height of the structure 7 in section A. As can also be seen from FIG. 5, the height of the structure extends symmetrically in relation to a plane 12 represented by a dot-dash line.

Additional smooth sheet metal layers 5 and further structured sheet metal layers 13 are disposed in section B. The structured sheet metal layers 13 and the smooth sheet metal layers 5 extend only over the section B. The structured sheet metal layers 13 fill an intermediate space between the structures 8 of the continuous structured sheet metal layers 11.

Additional smooth sheet metal layers 6 are disposed between the structured sheet metal layers 11, 14 in section C.

Figure 6:
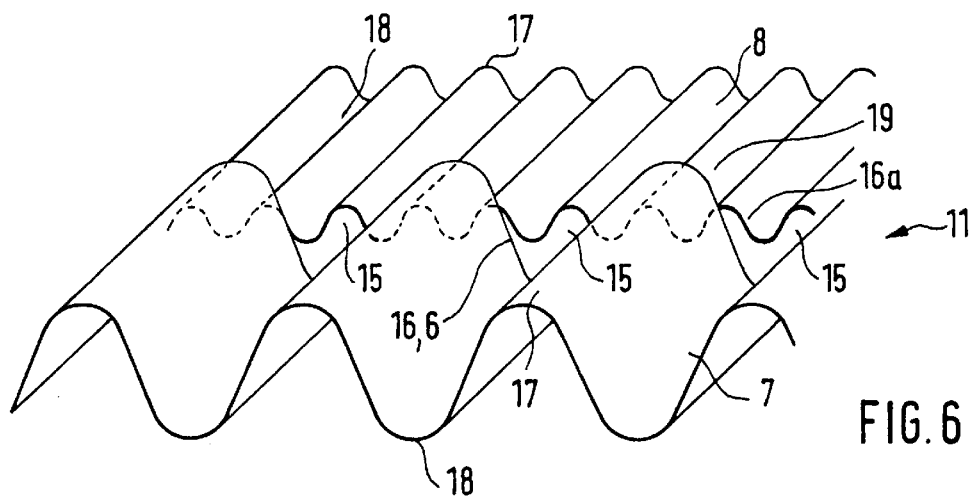
FIG. 6 is a fragmentary, perspective view of a structured sheet metal layer.

FIG. 6 represents a perspective view of a structured sheet metal layer 11. The structured sheet metal layer 11 has a corrugated structure. The corrugations are produced by an involute toothing. As can be seen from FIG. 6, the structured sheet metal layer 11 has a first structure 7, followed by a second structure 8. The structures 7 and 8 differ in their structure heights and in an interval between a corrugation crest 17 and a corrugation trough 18. A straight-line length between connecting points 16a, 16b of the structure 7 is equal to a straight-line length of the structure 8. The structures 7 and 8 are separated from one another by physical dividing lines 15. The connection is made at common sides 19. Gradients of the sides 19 are identical on both of the structures 7, 8 at the connecting points.

Figure 7:
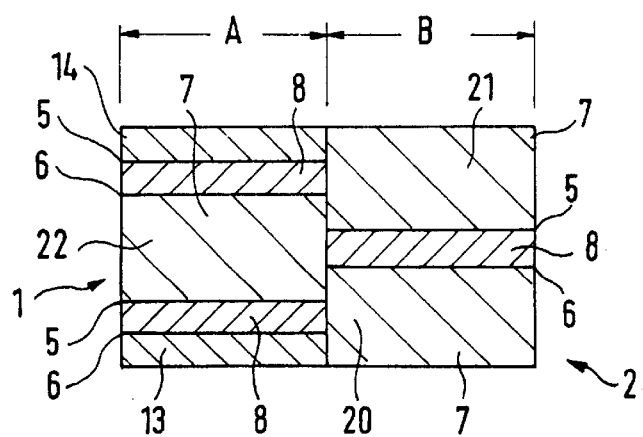
FIG. 7 is a further longitudinal, sectional view through a modified honeycomb body.

FIG. 7 shows a diagram of a further embodiment of a honeycomb body. The illustrated honeycomb body has two sections A, B. The honeycomb body which is shown also has continuous, structured sheet metal layers 20, 21, and 22. The structured sheet metal layers 20, 21 and 22 have two structures 7, 8. The structure 7 is larger in its dimensions than the structure 8.

Further structured sheet metal layers 13, 14 are provided in section A. The inlet flow end section A of the honeycomb body has a central area, in which the channels are larger than in an outer area. This measure increases a catalytically active surface in the outer flow area of the honeycomb body. As will be seen from FIG. 7, the number of channels per cross-sectional area can also be varied in a direction transverse to the direction of flow. The structured sheet metal layers 20, 21 and 22 have an identical structure. The configuration represented in FIG. 7 is obtained by rotating the sheet metal layer 22 through 180° about an axis essentially perpendicular to the direction of flow.

I claim:

1. A monolithic honeycomb body, comprising:
   mutually spaced-apart inlet and outlet flow ends defining a flow direction;
   different successive sections between said flow ends, said sections being disposed along the flow direction and having respective heat capacities increasing from said inlet flow end to said outlet flow end;
   at least partially structured sheet metal layers having structures forming walls defining channels through which a fluid can flow in one flow direction;
   said channels having sizes varying in said different successive sections in the flow direction;
   at least a part of said structured sheet metal layers extending from said inlet flow end to said outlet flow end;
   each of said sheet metal layers having at least a first structure and a second structure with different dimensions; and
   at least one of said structures extending over only one of said sections.

2. The honeycomb body according to claim 1, including additional sheet metal layers disposed between said structured sheet metal layers, said additional sheet metal layers extending over at least one of said sections.

3. The honeycomb body according to claim 2, wherein said additional sheet metal layers are smooth.

4. The honeycomb body according to claim 2, wherein said additional sheet metal layers are slightly structured relative to dimensions of said channels.

5. The honeycomb body according to claim 1, including further structured sheet metal layers extended over at least one of said sections.

6. The honeycomb body according to claim 5, wherein said structured sheet metal layers extending from said inlet flow end to said outlet flow end have intervals therebetween being occupied in at least one of said sections by said further structured sheet metal layers.

7. The honeycomb body according to claim 5, wherein said further structured sheet metal layers provide the honeycomb body with a constant cross-section in the flow direction.

8. The honeycomb body according to claim 1, wherein said structures of said sheet metal layers extending from said inlet flow end to said outlet flow end are formed symmetrically relative to a common plane.

9. The honeycomb body according to claim 1, wherein each of said sheet metal layers extending from said inlet flow end to said outlet flow end has physical dividing lines formed at an interval from one another and running substantially transversely to the flow direction between adjacent ones of said structures with different dimensions.

10. The honeycomb body according to claim 9, wherein a section between an adjacent two of said dividing lines is disposed at least partially on a common side of said adjacent structures.

11. The honeycomb body according to claim 9, wherein a section between an adjacent two of said dividing lines is disposed at least partially on a common crest of said adjacent structures.

12. The honeycomb body according to claim 9, wherein a section between an adjacent two of said dividing lines is disposed at least partially on a trough of said adjacent structures.

13. The honeycomb body according to claim 1, wherein said structures of adjacent ones of said structured sheet metal layers extend obliquely relative to one another and cannot slide into one another.

14. The honeycomb body according to claim 1, wherein at least a part of said sheet metal layers has a greater thickness than a remainder of said sheet metal layers.

15. The honeycomb body according to claim 1, wherein said sheet metal layers include continuous sheet metal layers, and said sheet metal layers in an inner section have a greater thickness than said continuous sheet metal layers.

16. A method for manufacturing a monolithic honeycomb body having inlet and outlet flow ends, which comprises:

forming structures in at least one sheet metal layer;

intertwining the at least one sheet metal layer to form a honeycomb body with walls formed by the structures defining channels through which a fluid can flow in one flow direction; and before or during the forming of the structures, forming mutually spaced apart physical dividing lines in each of the sheet metal layers along a common imaginary line running substantially transversely to the flow direction, and forming the structures with different dimensions on both sides of the dividing lines, to form sections along the flow direction, the sections having respective heat capacities increasing from the inlet flow end toward the outlet flow end of the honeycomb body.

17. The method according to claim 16, which further comprises forming the different dimensions of the structures as different structural heights.

18. The method according to claim 16, which further comprises carrying out the step of forming the dividing lines by cutting into the at least one sheet metal layer.

19. The method according to claim 16, which further comprises carrying out the step of forming the dividing lines by cutting into the sheet metal layer with a cutter.

20. The method according to claim 16, which further comprises carrying out the step of forming the dividing lines by cutting into the sheet metal layer with a rotary cutter.

21. The method according to claim 16, which further comprises carrying out the step of forming the dividing lines in the sheet metal layer by laser cutting.

22. The method according to claim 16, which further comprises simultaneously carrying out the steps of forming the structures with different dimensions and forming the dividing lines, by corrugation of the at least one sheet metal layer using different corrugated rollers disposed side by side on one axis.

* * * * *